(12) United States Patent
Kachare et al.

(10) Patent No.: US 12,450,188 B2
(45) Date of Patent: *Oct. 21, 2025

(54) SYSTEM AND METHOD FOR PROVIDING IN-STORAGE ACCELERATION (ISA) IN DATA STORAGE DEVICES

(71) Applicant: Samsung Electronics Co., Ltd., Suwon-si (KR)

(72) Inventors: Ramdas Kachare, San Jose, CA (US); Fred Worley, San Jose, CA (US); Xuebin Yao, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,697

(22) Filed: May 29, 2024

(65) Prior Publication Data
US 2024/0320182 A1    Sep. 26, 2024

Related U.S. Application Data

(63) Continuation of application No. 17/953,011, filed on Sep. 26, 2022, now Pat. No. 12,001,374, which is a (Continued)

(51) Int. Cl.
*G06F 13/42* (2006.01)
*G06F 3/06* (2006.01)
(Continued)

(52) U.S. Cl.
CPC ........ *G06F 13/4234* (2013.01); *G06F 3/0611* (2013.01); *G06F 3/0632* (2013.01);
(Continued)

(58) Field of Classification Search
CPC .... G06F 13/00; G06F 13/4234; G06F 3/0611; G06F 3/0632; G06F 3/0659; G06F 3/06;
(Continued)

(56) References Cited

U.S. PATENT DOCUMENTS

| | | |
|---|---|---|
| 8,429,394 B1 | 4/2013 | Natoli et al. |
| 8,937,930 B2 | 1/2015 | Sprigg et al. |

(Continued)

FOREIGN PATENT DOCUMENTS

| | | |
|---|---|---|
| CN | 102648454 A | 8/2012 |
| CN | 105068953 A | 11/2015 |

(Continued)

OTHER PUBLICATIONS

Abbani, N. et al., "A Distributed Reconfigurable Active SSD Platform for Data Intensive Applications", IEEE International Conference on High Performance Computing and Communications, 2011, pp. 25-34.

(Continued)

*Primary Examiner* — Pierre Michel Bataille
(74) *Attorney, Agent, or Firm* — Lewis Roca Rothgerber Christie LLP

(57) ABSTRACT

A data storage device includes: a data storage medium; a processor comprising a plurality of processor cores; a plurality of application acceleration black-box (AABB) slots including reconfigurable logic blocks, interconnects, and memories; a host interface that receives a host command from a remote application running on a remote host computer, wherein the host command includes an image file including a register-transfer level (RTL) bitstream and a firmware driver; and a configuration controller that downloads the RTL bitstream to an AABB slot of the plurality of AABB slots and reconfigure the AABB slot, and load the firmware driver to a processor core of the processor. The processor core loaded with the firmware driver runs a data acceleration process of the remote application to access and process data stored in the data storage medium using the RTL bitstream downloaded in the AABB slot.

20 Claims, 10 Drawing Sheets

Related U.S. Application Data continuation of application No. 16/928,711, filed on Jul. 14, 2020, now Pat. No. 11,487,696, which is a continuation of application No. 15/921,400, filed on Mar. 14, 2018, now Pat. No. 10,719,474.

(60) Provisional application No. 62/571,064, filed on Oct. 11, 2017, provisional application No. 62/571,061, filed on Oct. 11, 2017.

(51) Int. Cl.
| | |
|---|---|
| *G06F 9/4401* | (2018.01) |
| *G06F 13/16* | (2006.01) |
| *G06F 13/40* | (2006.01) |
| *H04L 49/356* | (2022.01) |
| *G06N 20/00* | (2019.01) |

(52) U.S. Cl.
CPC ............ *G06F 3/0659* (2013.01); *G06F 3/067* (2013.01); *G06F 9/4411* (2013.01); *G06F 13/1668* (2013.01); *G06F 13/4027* (2013.01); *G06F 13/4221* (2013.01); *G06F 13/4295* (2013.01); *H04L 49/356* (2013.01); *G06F 2213/0008* (2013.01); *G06F 2213/0026* (2013.01); *G06N 20/00* (2019.01)

(58) Field of Classification Search
CPC .... G06F 3/067; G06F 9/4411; G06F 13/1668; G06F 13/4027; G06F 13/4221; G06F 13/4295; G06F 2213/0008; G06F 2213/0026; H04L 49/356; G06N 20/00
See application file for complete search history.

(56) References Cited

U.S. PATENT DOCUMENTS

| | | | |
|---|---|---|---|
| 9,218,443 | B1 | 12/2015 | Styles et al. |
| 9,298,654 | B2 | 3/2016 | Fleischer et al. |
| 9,304,690 | B2 | 4/2016 | McCambridge et al. |
| 9,703,494 | B1 | 7/2017 | Rajwade et al. |
| 9,824,173 | B1 | 11/2017 | An et al. |
| 9,826,464 | B2 | 11/2017 | Visuri et al. |
| 9,864,828 | B1 | 1/2018 | Puthana et al. |
| 9,959,203 | B2 | 5/2018 | Sabol et al. |
| 9,971,697 | B2 | 5/2018 | Kim et al. |
| 9,977,758 | B1* | 5/2018 | Schumacher ....... G06F 13/4221 |
| 10,180,850 | B1 | 1/2019 | Kasat et al. |
| 10,261,813 | B2 | 4/2019 | Persson et al. |
| 10,366,190 | B2 | 7/2019 | Titley |
| 10,394,746 | B2 | 8/2019 | Kachare et al. |
| 10,447,728 | B1 | 10/2019 | Steinberg |
| 10,558,777 | B1 | 2/2020 | Yu et al. |
| 10,620,855 | B2 | 4/2020 | Marripudi et al. |
| 10,956,241 | B1 | 3/2021 | Neema et al. |
| 2008/0288231 | A1 | 11/2008 | Nakayama |
| 2009/0251867 | A1 | 10/2009 | Sharma et al. |
| 2010/0011035 | A1 | 1/2010 | Adkins et al. |
| 2010/0146338 | A1 | 6/2010 | Schalick et al. |
| 2011/0219208 | A1 | 9/2011 | Asaad |
| 2012/0089655 | A1 | 4/2012 | Erinjippurath et al. |
| 2013/0060981 | A1 | 3/2013 | Horn et al. |
| 2013/0305241 | A1 | 11/2013 | Chandrakar et al. |
| 2014/0071855 | A1 | 3/2014 | Robitaille et al. |
| 2015/0180503 | A1 | 6/2015 | Schubert et al. |
| 2015/0254088 | A1 | 9/2015 | Chou et al. |
| 2015/0347257 | A1 | 12/2015 | Olgiati et al. |
| 2016/0132441 | A1 | 5/2016 | Styles et al. |
| 2016/0259597 | A1 | 9/2016 | Worley et al. |
| 2016/0335024 | A1 | 11/2016 | Zhong et al. |
| 2016/0350329 | A1 | 12/2016 | Resch |
| 2017/0046179 | A1 | 2/2017 | Teh et al. |
| 2017/0068460 | A1 | 3/2017 | Shin et al. |
| 2017/0123780 | A1 | 5/2017 | Albot et al. |
| 2017/0286363 | A1 | 10/2017 | Joshua et al. |
| 2017/0323045 | A1* | 11/2017 | Huang ................... G06F 30/34 |
| 2017/0323305 | A1 | 11/2017 | Pradeep |
| 2017/0344388 | A1 | 11/2017 | Ramos da Rocha |
| 2018/0095871 | A1 | 4/2018 | Dreier et al. |
| 2018/0113811 | A1* | 4/2018 | Xing ................... G06F 12/109 |
| 2018/0321859 | A1 | 11/2018 | Jung et al. |
| 2019/0034301 | A1* | 1/2019 | West ..................... G06F 9/3877 |
| 2019/0034363 | A1 | 1/2019 | Palermo et al. |
| 2019/0042433 | A1* | 2/2019 | Porpodas .............. G06F 8/4442 |
| 2019/0049912 | A1 | 2/2019 | Poornachandran et al. |
| 2019/0173734 | A1 | 6/2019 | Nachimuthu et al. |
| 2021/0365392 | A1 | 11/2021 | He |

FOREIGN PATENT DOCUMENTS

| | | | |
|---|---|---|---|
| CN | 105247930 | A | 1/2016 |
| CN | 105408875 | A | 3/2016 |
| CN | 105579961 | A | 5/2016 |
| CN | 106462498 | A | 2/2017 |
| CN | 106575271 | A | 4/2017 |
| CN | 106997324 | A | 8/2017 |
| EP | 2911065 | B1 | 12/2017 |
| JP | 2018-41448 | A | 3/2018 |
| JP | 2018-141448 | A | 9/2018 |
| JP | 2019-075104 | A | 5/2019 |
| WO | WO 2015/200313 | A1 | 12/2015 |
| WO | WO-2016077393 | A1 * | 5/2016 ............. G06F 30/34 |
| WO | WO 2017/040706 | A1 | 3/2017 |
| WO | WO 2019/244656 | A1 | 12/2019 |

OTHER PUBLICATIONS

Artail, Hassan et al., "Speedy Cloud: Cloud Computing with Support for Hardware Acceleration Services", IEEE Transactions on Cloud Computing, vol. 7, No. 3, Jul.-Sep. 2019, pp. 850-865.

Bomel, Pierre et al, "Bitstreams Repository Hierarchy for FPGA Partially Reconfigurable Systems", 2008 International Symposium on Parallel and Distributed Computing, pp. 228-234.

Gong, Lingkan and Diessel, Oliver, "ReSim: A Reusable Library for RTL Simulation of Dynamic Partial Reconfiguration", 2011 International Conference on Field-Programmable Technology, 2011, pp. 1-8.

Gong, Lingkan et al., "RTL Simulation of High Performance Dynamic Reconfiguration: A Video Processing Case Study", 2013 IEEE International Symposium on Parallel & Distributed Processing, Workshops and PhD Forum, pp. 106-113.

Gopikrishna, S., et al. "A multiprocessor System on Chip verification on hardware accelerator and Software Emulation," 2016 IEEE International Conference on Advances in Electronics, Communication and Computer Technology (ICAECCT), Pune, India, 2016, pp. 423-428.

Guan, Yijin et al, "FP-DNN: An Automated Framework for Mapping Deep Neural Networks onto FPGAs with RTL-HLS Hybrid Templates", Center for Energy-Efficient Computing and Applications, Peking University, Beijing, China; Department of Electronic and Computer Engineering, Hong Kong University of Science and Technology, China; Microsoft Research Asia, Beijing, China; Computer Science Department, University of California, Los Angeles, USA; PKU/UCLA Joint Research Institute in Science and Engineering; Apr. 30, 2017, pp. 1-8.

"IEEE Standard for In-System Configuration of Programmable Devices," in IEEE Std 1532-2000, vol. No., pp. 1-92, Jan. 12, 2000.

M.A. Iqbal and U.S. Awan, "Reconfigurable Processor Architecture for High Speed Applications," 2009 IEEE International Advance Computing Conference, Patiala, India, 2009, pp. 624-629, doi: 10.1109/IADCC.2009.4809084.

Koch, Dirk et al., "Partial Reconfiguration on FPGAs in Practice—Tools and applications", ARCS 2012, 2012 pp. 1-12.

Ma Yufei et al, "Scalable and Modularized RTL Compilation of Convolutional Neural Networks onto FPGA", School of Electrical, Computer and Energy Engineering; School of Computing, Informatics, Decision Systems Engineering, Arizona State University, Tempe, AZ, USA; Aug. 29, 2016, pp. 1-8.

(56) References Cited

OTHER PUBLICATIONS

Muralikrishna, B., et al., Reconfigurable System-On-Chip Design Using FPGA, 2014 $2^{nd}$ International Conference on Devices, Circuits and Systems (ICDCS), 2014, pp. 1-6.
Rossi, Davide, et al., "A Heterogeneous Digital Signal Processor for Dynamically Reconfigurable Computing", IEEE Journal of Solid-State Circuits, vol. 45, No. 8, Aug. 2010 (pp. 1615-1626), doi: 10.1109/JSSC.2010.2048149.
Chinese Office Action dated Jan. 4, 2024, issued in Chinese Patent Application No. 201810911803.0 (5 pages).

* cited by examiner

| 31 | 24 | 23 | 16 | 15 | 8 | 7 | 0 | DW |
|---|---|---|---|---|---|---|---|---|
| | | CID | | | | OPC | | DW 0 |
| | | | | | | | | DW 1 |
| | | | | | | | | DW 2 |
| | | | | | | | | DW 3 |
| | | | | | | | | DW 4 |
| | | | | | | | | DW 5 |
| | | DPTR : SGL1 OR {PRP2, PRP1} | | | | | | DW 6 |
| | | | | | | | | DW 7 |
| | | | | | | | | DW 8 |
| | | | | | | | | DW 9 |
| | | NUMD | | | | | | DW 10 |
| | | OFST | | | | | | DW 11 |
| | | AABB Slot ID | | | | | | DW 12 |
| | | | | | | | | DW 13 |
| | | | | | | | | DW 14 |
| | | | | | | | | DW 15 |

SYSTEM AND METHOD FOR PROVIDING IN-STORAGE ACCELERATION (ISA) IN DATA STORAGE DEVICES

CROSS-REFERENCE TO RELATED APPLICATION(S)

This application is a continuation of U.S. patent application Ser. No. 17/953,011, filed Sep. 26, 2022, which is a continuation of U.S. patent application Ser. No. 16/928,711, filed Jul. 14, 2020, now U.S. Pat. No. 11,487,696, which is a continuation application of U.S. patent application Ser. No. 15/921,400 filed Mar. 14, 2018, now U.S. Pat. No. 10,719,474, which claims the benefits of and priority to U.S. Provisional Patent Application Ser. Nos. 62/571,064 and 62/571,061 filed Oct. 11, 2017, the entire contents of each of which are incorporated herein by reference.

TECHNICAL FIELD

The present disclosure relates generally to data processing acceleration in data storage systems, and more particularly, to a system and method for providing in-storage acceleration in data storage devices, particularly NVMe and NVMe-OF devices.

BACKGROUND

Solid-state drives (SSDs) are rapidly becoming main storage elements of modern datacenter infrastructure quickly replacing traditional storage devices such as hard disk drives (HDDs). SSDs offer low latency, high data read/write throughput, and reliable persistent storage of user data. Non-volatile memory express (NVMe) over fabrics (NVMe-oF) is an emerging technology that allows hundreds and thousands of SSDs to be connected over a fabric network such as Ethernet, Fibre Channel, and Infiniband.

The NVMe-oF protocol enables remote direct-attached storage (rDAS) allowing a large number of NVMe SSDs to be connected to a remote host over the established fabric network. The NVMe-oF protocol also supports remote direct memory access (RDMA) to provide a reliable transport service to carry NVMe commands, data, and responses over the network. iWARP, RoCE v1, and RoCE v2 are some examples of the transport protocols that provide an RDMA service.

A data storage system using disaggregated data storage devices (e.g., NVMe-oF-compatible SSDs, herein also referred to as NVMe-oF SSDs or eSSDs in short) can provide a large storage capacity to an application running on a host computer. The application can collect a large amount of data (big data) from the disaggregated data storage devices and analyze them.

Since the scale of big data processing is very large, the infrastructure to perform meaningful big data mining can be cost prohibitive, requiring heavy computing resources, large system memories, a high bandwidth network, as well as large and high-performance data storage devices for storing the big data. It would be desirable to offload some data processing mining tasks from the host computer to the data storage devices and minimize data movements from the data storage devices to the host computer.

SUMMARY

According to one embodiment, a data storage device includes: a data storage medium; a processor comprising a plurality of processor cores; a plurality of application acceleration black-box (AABB) slots including reconfigurable logic blocks, interconnects, and memories; a host interface that receives a host command from a remote application running on a remote host computer, wherein the host command includes an image file including a register-transfer level (RTL) bitstream and a firmware driver; and a configuration controller that downloads the RTL bitstream to an AABB slot of the plurality of AABB slots and reconfigure the AABB slot, and load the firmware driver to a processor core of the processor. The processor core loaded with the firmware driver runs a data acceleration process of the remote application to access and process data stored in the data storage medium using the RTL bitstream downloaded in the AABB slot.

According to another embodiment, a bridge device includes: a data storage interface that accesses data stored in a data storage medium of a data storage device; a processor comprising a plurality of processor cores; a plurality of application acceleration black-box (AABB) slots including reconfigurable logic blocks, interconnects, and memories; a host interface that receives a host command from a remote application running on a remote host computer, wherein the host command includes an image file including a register-transfer level (RTL) bitstream and a firmware driver; and a configuration controller that downloads the RTL bitstream to an AABB slot of the plurality of AABB slots and reconfigure the AABB slot, and load the firmware driver to a processor core of the processor. The processor core loaded with the firmware driver runs a data acceleration process of the remote application to access the data stored in the data storage medium of the data storage device via the data storage interface and process the data using the RTL bitstream downloaded in the AABB slot.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIG. 6 shows an AABB Download command format, according to one embodiment;

FIG. 7 shows an example of AABB slot management commands, according to one embodiment;

FIG. 8 shows an example format of an AABB Comm command, according to one embodiment;

Figure 1:
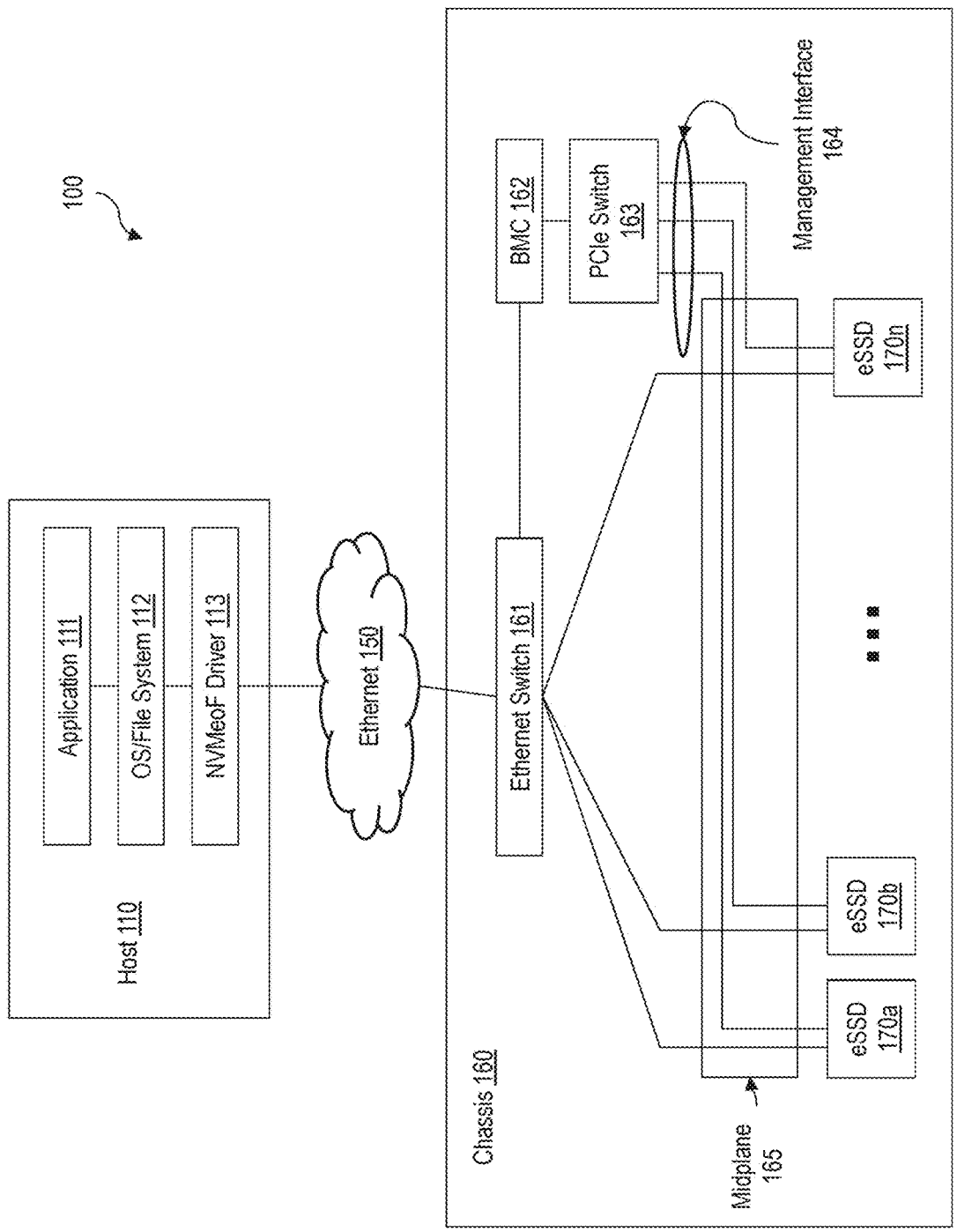
FIG. 1 shows a block diagram of an example data storage system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide in-storage acceleration in data storage devices, particularly NVMe and NVMe-OF devices. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 shows a block diagram of an example data storage system, according to one embodiment. The data storage system 100 includes a host 110 and a chassis 160 (herein also referred to as an eSSD chassis) containing one or more NVMe-oF-compatible Ethernet SSDs (eSSDs). For example, the chassis 160 includes 24 or 48 eSSDs. The eSSDs in the chassis 160 are respectively denoted as eSSDs 170a-170n (herein collectively referred to as eSSDs 170). The host 110 includes an application 111, an operating system (OS) and a file system (FS) 112, and an NVMe-oF driver 113. An initiator (e.g., the application 111) of the host 110 can establish an NVMe-oF connection with the eSSDs 170 over the Ethernet 150 using the NVMe-oF driver 113. The chassis 160 includes an Ethernet switch 161, a baseboard management controller (BMC) 162, and a peripheral component interconnect express (PCIe) switch 163. The Ethernet switch 161 provides an Ethernet connection to the eSSDs 170 over the midplane 165, and the PCIe switch 163 provides a management interface 164 to the eSSDs 170 over the midplane 165. The BMC 162 can program the eSSDs 170 according to an instruction given by a system administrator.

The Ethernet switch 161 provides network connectivity between the host 110 and the eSSDs 170. The Ethernet switch 161 may have large-capacity (e.g., 100 Gbps) uplinks to connect to one or more hosts. The Ethernet switch 161 also has multiple lower-capacity (e.g., 25 Gbps) downlinks to connect to the eSSDs 170. For example, the Ethernet switch 161 contains 12 uplinks of 100 Gbps and 24 or 48 downlinks of 25 Gbps. The Ethernet switch 161 may have a special configuration/management port to the BMC 162.

The BMC 162 manages the internal components of the chassis 160 including the Ethernet switch 161, the PCIe switch 163, and the eSSDs 170. The BMC 162 can support PCIe and/or system management bus (SMBus) interfaces for the system management. The BMC 162 can configure the eSSDs 170 and program the Ethernet switch 161.

Similar to server based all-flash arrays (AFAs), eSSDs 170 are housed together in a server-less enclosure (i.e., the chassis 160) that contains a bunch of eSSDs, a network switch (i.e., the Ethernet switch 161) to connect them with the outside world's hosts and the BMC 162 to manage them. The BMC 162 handles the boot and control paths to the eSSD devices. Unlike a full-fledged x86 CPU, the BMC 162 may not do all those tasks that a CPU can handle and hence does the minimal enclosure management functions. The BMC 162 does keep a health check on the connected eSSDs 170 and related hardware for connectivity, status, temperature, logs, and errors through the SMBus or PCIe bus.

The eSSDs 170 offer a high-performance and large capacity data storage solution. The NVMe-oF protocol enables hundreds and thousands of disaggregated eSSDs 170 to be attached to the application 111 running on the host computer 110 in a remote direct attach (rDAS) manner. The present system and method facilitate the processing and movement of the large amount of data collected and stored in the disaggregated eSSDs. Such data processing using conventional host computers can be very expensive.

The application 111 running on the host computer 100 can perform processes such as machine learning by fetching data stored in the disaggregated data storage devices such as eSSDs 170 across the network (e.g., Ethernet 150), process the data, and store the results of the data processing back to the data storage devices. Such a process including data fetching, processing, and storage can be highly inefficient, consuming excessive energy, computing, network, and data storage resources on the host computer. In addition, the process may impose costly requirements on the compute and memory resources on the host computer.

Figure 2:
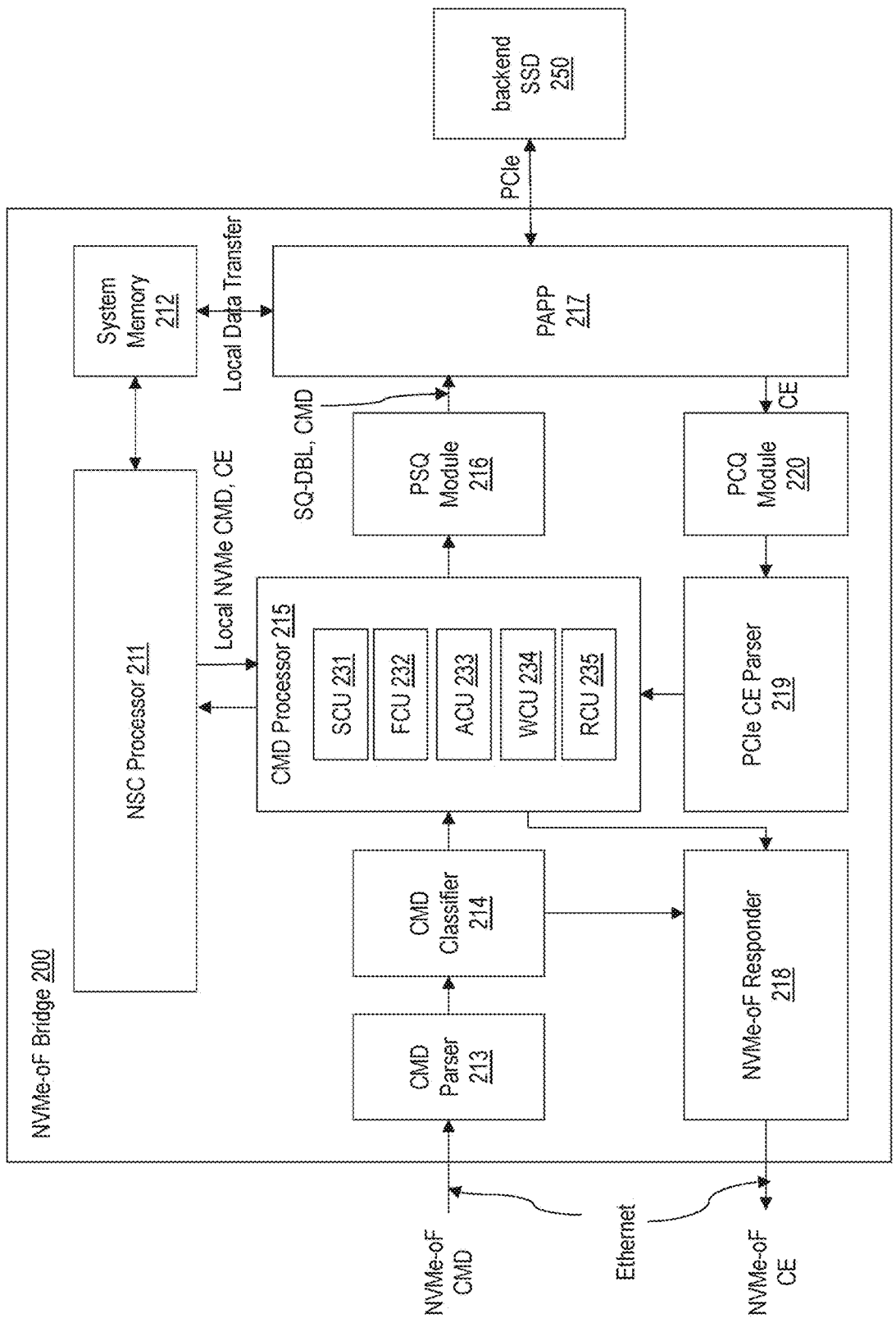
FIG. 2 shows a block diagram of an example NVMe-oF bridge device, according to one embodiment.

FIG. 2 shows a block diagram of an example NVMe-oF bridge device, according to one embodiment. The bridge device may be integrated in a data storage device, or the bridge device may refer to a separate (and discrete) device that is connected to the data storage device. In the following examples, an eSSD is described as a device including both a bridge device and a backend SSD; however, it is understood that a data storage device (backend SSD) may be connected to a discrete bridge device to form an eSSD, or an eSSD may refer to a bridge device itself or a device capable of performing the near-computing functions of the bridge device in other embodiments.

The NVMe-oF bridge device 200 includes a near-storage compute (NSC) processor 211, a system memory 212, a command parser 213, a command classifier 214, and a command processor 215, a PCIe-side command submission queue (PSQ) module 216, a PCIe application (PAPP)/root complex module 217, an NVMe-oF responder 218, a PCIe CE parser 219, and a PCIe-side command completion queue (PCQ) module 220. The NVMe-oF bridge device 200 is coupled to a backend SSD (e.g., an NVMe SSD) 250 via the PCIe bus. A remote initiator running on a host computer sends NVMe-OF commands to the backend SSD 250 over the fabric network, in the present example, Ethernet.

The command parser 213 of the NVMe-oF bridge device 200 intercepts NVMe-oF commands destined for the backend SSD 250, parses them, and sends the parsed NVMe-oF commands to the command classifier 214. For example, the command parser 213 extracts and parses various commands including, but not limited to, a command opcode (OPC), a command identifier (CID), a namespace identifier (NSID), a number of logical blocks (NLB), and a start logical block address (SLBA). The command classifier 214 classifies the parsed NVMe-oF commands into different groups and sends the classified NVMe-OF commands to the command processor 215. For example, the command classifier 214 classifies admin commands, fabric commands, read commands, write commands, and special commands. Different commands or groups of NVMe-oF commands can be processed using specialized command processing units of the command processor 215. For example, the command processor 215 includes a special command unit (SCU) 231, a fabrics command unit (FCU) 232, an admin command unit (ACU) 233, a read command unit (RCU) 234, and a write command unit (WCU) 235.

These command processing units 231-235 translate the NVMe-OF commands into NVMe commands and place them into the PSQ module 216. According to one embodiment, the PSQ module 216 implements a command submission queues and maintains head and tail pointers for the active submission queues. The PSQ module 216 can detect the active submission queues and generate conditional flags indicating that the submission queue is full or empty. When NVMe commands are placed into the submission queues, the PSQ module 216 can generate and send doorbell events (submission queue-doorbell) to the backend SSD 250 via the PAPP module 217. The PAPP module 217 implements a PCIe transport to the backend SSD 250 to send the door-bell events over the PCIe bus. The PAPP module 217 supports standard PCIe transaction commands including config read, config write, memory write, and memory read that are generated by the NVMe-oF bridge device 200. In addition, the PAPP module 217 supports PCIe memory read and memory write transactions generated by a PCIe end-point other than the NVMe-oF bridge device 200. In other words, the PAPP module 217 implements and supports a PCIe root complex function of the NVMe-oF bridge device 200 rendering the NVMe-oF bridge device 200 a PCIe root complex device.

The PCQ module 220 implements command completion queues for the backend SSD 250. The backend SSD 250 can write a command completion entry (CE) for each NVMe command it processes. Normally, there is one-to-one mapping between the command submission queue and the command completion queue. The PCIe CE parser 219 parses the completion entries (CEs) received from the PCQ module 220 and interprets them. The PCIe CE parser 219 forwards the parsed CEs to the appropriate command processing units 231-235 that generated the corresponding NVMe commands. The appropriate command units 231-235 generate NVMe-oF CEs corresponding to the PCIe CEs (or NVMe CEs) that are received from the PCIe CE parser 219 and forward them to the NVMe-OF responder 218 for issuing the NVMe-oF CEs back to the remote initiator over the NVMe-OF interface (e.g., Ethernet). The NVMe-OF CEs may precede read data or write data transfers to/from the remote initiator. As a part of the NVMe-oF command bridging, the command units 231-235 facilitate data transfer between the backend SSD 250 and the remote initiator.

In response to the door-bell events, the backend SSD 250 fetches the NVMe commands received from the PSQ module 216 and executes them. As a part of the command execution, the backend SSD 250 may perform data transfers. Such data transfers can be done to/from the system memory 212 or on-chip or off-chip memory available in the NVMe-oF bridge device 200.

Data storage devices such as NVMe and NVMe-oF SSDs can store vast amounts of data. Data processing near or in the data storage device would be more efficient and cost effective than moving the data from the data storage device to a remote host computer and processing the data within the remote host computer.

The present disclosure describes an in-storage acceleration (ISA) platform to accelerate data processing of a remote application in data storage devices such as NVMe and NVMe-oF SSDs that store the actual target data to process. For example, the present ISA platform may be implemented in a controller of the NVMe or NVMe-oF SSDs (e.g., the eSSD 170 of FIG. 1). In another example, the present ISA platform may be implemented in a controller of a bridge device (e.g., the NVMe-oF bridge device 200 of FIG. 2). In this regard, the term "in-storage acceleration" is used herein to indicate not only data processing in an actual data storage device that stores the target data but also a bridge device that is placed nearby the data storage device to provides an interface (or protocol translation) to the data storage device.

A data-centric host application that involves a large amount of data processing can be greatly benefited from using the present ISA platform. Functions of the host application that perform heavy duty data processing and manipulation can be offloaded to a data storage device or a bridge device for performing near or in-storage acceleration. The present ISA platform can provide an efficient data processing solution from an energy and bandwidth perspective while lowering the overall cost of compute and storage infrastructure.

According to one embodiment, a data-intensive application (e.g., a machine learning (ML) application, a big data application) running on a remote host computer can offload some data processing functions to a data storage device and/or a bridge device. The data storage device or the bridge device can accelerate data processing by minimizing data transfer between the data storage device that stores the actual target data and the remote host computer that runs the data-intensive application that requires an access to the target data stored in the data storage device. The present ISA platform enables the user data to be processed more efficiently closer to or at the data storage device by minimizing data movements between the data storage device and the remote host computer that runs the data-intensive application. Therefore, the present ISA platform can achieve better application performance while reducing the cost involved with the computing, networking, and storage infrastructure on the host computer.

The present ISA platform is applicable to various types of data storage devices. However, NVMe SSDs or NVMe-oF SSDs are shown hereinafter as examples of the data storage devices for the convenience of explanation.

According to one embodiment, the data storage device or the bridge device that performs data processing acceleration includes field programmable gate array (FPGA)-based reconfigurable logic blocks. The FPGA-based reconfigurable logic blocks work in tandem with a controller of the NVMe/NVMe-oF SSD (herein also referred to as an NVMe/NVMe-oF controller) or a controller of the bridge device (herein also referred to as a bridge device controller) to enable offloading and accelerating portions of an application. Those FPGA-based reconfigurable logic blocks can be connected to the NVMe/NVMe-oF controller externally or embedded in the NVMe/NVMe-oF controller. An application user can use those reconfigurable logic blocks coupled to or embedded in the NVMe/NVMe-oF SSD to implement functions of the application for acceleration.

The present ISA platform is agnostic to the application running on the remote host computer that is being accelerated. The present ISA platform can accelerate applications in a generic manner so that the present ISA platform is applicable to various types of applications and data storage devices. In addition, the user can use the present ISA platform in a self-service fashion. For example, a user can select and download any portion of the application during runtime and can change the application at runtime.

For a given application, a use can identify functions or components of the application that process or manipulate a large amount of data. The identified functions are the ones that can be offloaded to the ISA platform for accelerating the performance of the application. According to one embodiment, a user can download functions of the application to a predefined storage area of the data storage device (or the bridge device) including reconfigurable logic blocks, hereinafter also referred to as black-boxes. It is noted that the term, "black-box" used herein refers a collection of reconfigurable logic blocks that can offload a function from an application code for accelerating certain data-access and processing functions to the data storage device (or the bridge device) of a device near the data storage device (or the bridge device). Each collection of the reconfigurable logic blocks is herein conveniently referred to as an application acceleration black-box (AABB). Each of the AABBs may have a different size and capabilities depending on how the reconfigurable logic blocks are configured.

The AABB has two primary components: a hardware piece referred to as a register-transfer level (RTL) black-box and a firmware piece referred to as an RTL black-box driver. The RTL black-box contains a hardware processing engine, and the RTL black-box driver is a firmware driver for the RTL engine or a normal firmware driver corresponding to the function to accelerate. In some embodiment, an AABB can have only a firmware piece without a hardware piece.

The present ISA platform uses the RTL black-box component to reconfigure a pre-defined and pre-provisioned FPGA logic area, i.e., reconfigurable logic blocks of the ISA platform. The RTL black-box driver is a firmware driver associated with the reconfigured RTL block-box that is intended to run on a processor core of the embedded controller (e.g., an NVMe/NVMe-oF controller or a bridge controller). When a user's requirement and a need for the current accelerated function is completed, the user can disable or discard the AABB and download a new AABB to the discarded AABB slot. An AABB that is downloaded and assigned to a corresponding AABB slot is referred to as an active AABB slot. An active AABB slot is ready to perform an accelerated function. A host command may include an AABB slot communication command to communicate with an active AABB slot. The AABB slot communication command may include an identifier of an active AABB slot. Multiple AABBs can be active in the ISA platform at any given time.

The present ISA platform provides a set of pre-provisioned and pre-defined AABB slots. Each such AABB slot can have a certain number of logic resources reserved and set aside. Different AABB slots may have same or different interfaces or resources defined. A user can discover the features, characteristics, and attributes of AABB slots supported, select a specific AABB slot to use, and download a circuit component and a firmware component into the selected AABB slot. It may be possible for an application to have only the firmware component. For example, the downloading of the circuit component and the firmware may be performed using "AABB Download" command.

In addition to the "AABB Download" command, the "AABB Management" command is used for management of AABB slots such as enable, disable, and discard of the downloaded AABB images. The "AABB Comm" command is used for a host application to communicate with an active AABB slot. The present ISA platform provides a set of application program interfaces (APIs) to allow a downloaded AABB image to receive AABB Comm commands, send completion entries (CEs) back to a remote host computer. In addition, the present ISA platform provides built-in APIs so that an AABB firmware can perform user data transfers to/from an SSD's NAND flash media as well as to/from a host memory. Using these command and data movement APIs, the AABB image can orchestrate user data processing, manipulation, and other transformations for user data at rest as well as user data in flight.

The present ISA platform can accelerate a third-party application using NVMe/NVMe-OF SSDs and/or a bridge device. A user can download application AABBs to the NVMe/NVMe-oF SSDs to accelerate desired functions (or portions of a desired function) of a user application. The present ISA platform enables a hardware component and an associated firmware component for a given AABB. The hardware component is in the form of RTL bitstream that can be loaded into one or more reconfigurable logic blocks in the NVMe/NVMe-oF SSD. The firmware component is loaded and executed on the embedded processor (or a processor core) of the NVMe/NVMe-oF SSD.

Although the user can identify functions to implement in the AABB slot, the AABB slot is still a black-box as far as the present ISA platform is concerned. That is, the present ISA platform and platform providers would not know or care how and for what purpose the AABBs are used. A user can define, create, download, and make use of the AABB slots provided by the present ISA platform in a self-service fashion. Although the following examples focus on embodiments of the present ISA platform allowing a user to run a third-party acceleration functions in the self-service fashion, it is understood that the present ISA platform can be used in a generic manner such that certain standard built-in black-box functions can be natively implemented in an NVMe/NVMe-OF SSD or a bridge device.

When a user downloads an AABB image to an AABB slot, the device (e.g., an NVMe/NVMe-oF SSD or a bridge device) that received the AABB image extracts the RTL and the firmware components. The RTL component can be delivered in the form of bitstream. The firmware component is delivered as an executable binary image. The RTL bitstream is used to reconfigure a FPGA area (i.e., AABB slot(s)) reserved for the corresponding black-box(es) and the driver binary is executed on the embedded processor (or a processor core of the embedded processor). The application running on the remote host computer can use an NVME command "AABB Comm" to communicate with the AABB image on the ISA platform. The device intercepts the "AABB Comm" command with a destination AABB slot identifier and forwards them to the appropriate AABB slot.

Figure 3:
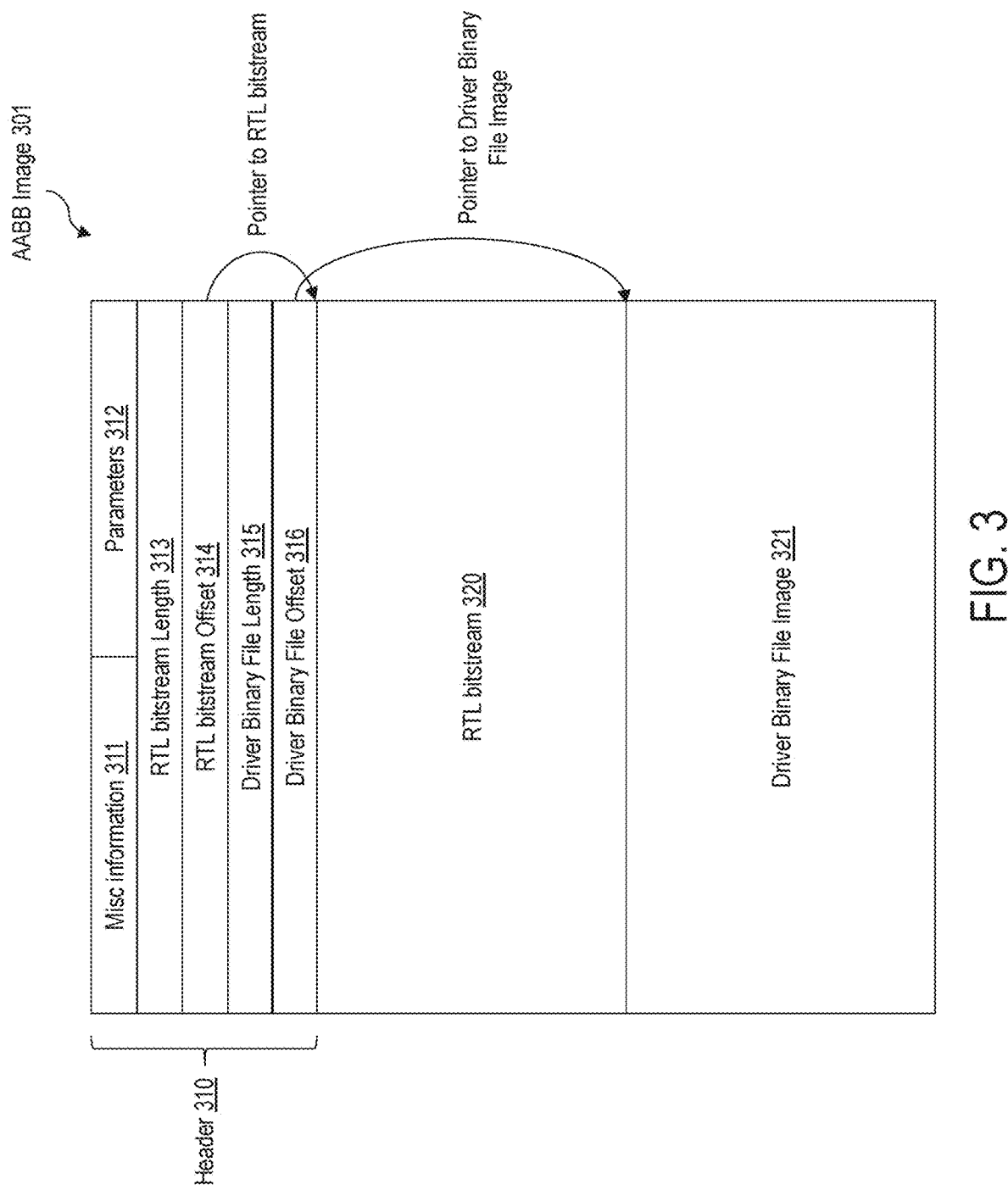
FIG. 3 shows a data structure of an example application acceleration black-box (AABB) image, according to one embodiment.

FIG. 3 shows a data structure of an example application acceleration black-box (AABB) image, according to one embodiment. The AABB image 301 includes a header 310, an RTL bitstream 320, and a driver binary image file 321. The header 310 includes miscellaneous information 311, parameters 312, RTL bitstream length 313, RTL bitstream offset 314, driver binary file length 315, and the driver binary file offset 316. The RTL bitstream offset 314 includes a pointer to the RTL bitstream 320 that has the size of the RTL bitstream length 313, and the driver binary file offset 316 includes a pointer to the driver binary file image 321 that has the driver binary file length 315. Although the present example shows only one header, and the corresponding RTL bitstream and driver binary image file, it is understood that a single AABB image can include multiple headers, RTL bitstreams, and driver binary image files without deviating from the present disclosure.

The present ISA platform can be implemented in a controller of an NVMe/NVMe-oF SSD (e.g., the eSSD 170 of FIG. 1) or in a controller of a bridge device (e.g., the NVMe-OF bridge device 200 of FIG. 2). In some embodiments, the controller may interact with FPGA-based reconfigurable logic blocks included in the NVMe/NVMe-OF SSD or the bridge device. In addition to a data storage capability, the present ISA platform provides a mechanism to implement and execute third-party functional blocks, i.e., AABB slots. The AABB slots are provisioned with a pre-determined amount of logic, compute, and memory resources that can be accessed through a set of pre-defined interfaces. The FPGA-based reconfigurable logic blocks implemented in the NVMe/NVMe-oF SSD or the bridge device can be used to implement heavy duty data processing functions of the third-party functional blocks in the controller of the NVMe/NVMe-oF SSD or the bridge device. The compute resources of the controller processor can be used by the user to implement control algorithms as well as a driver firmware for the hardware acceleration engine. In some embodiments, the user may just use firmware resources for some use cases.

Figure 4:
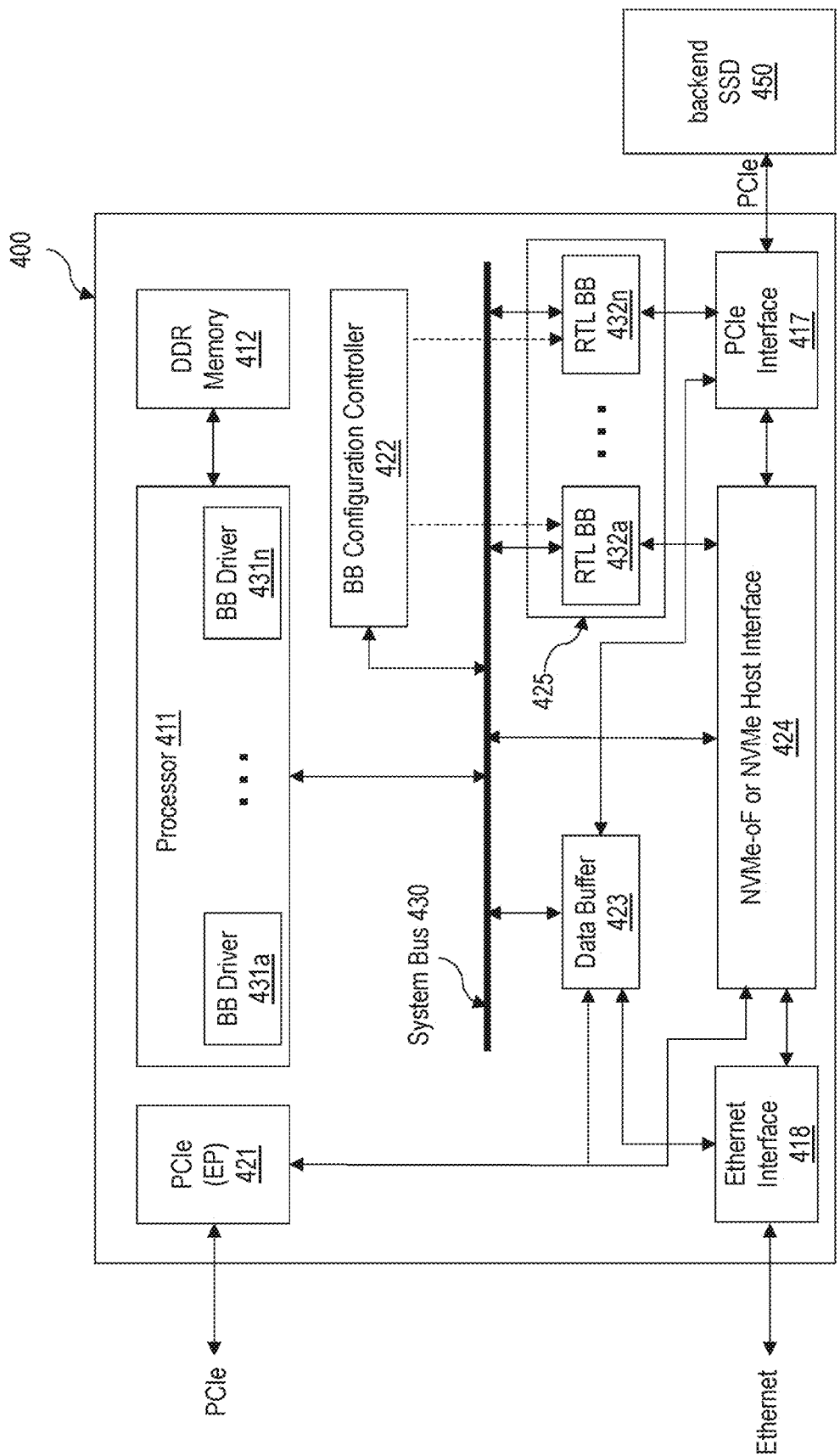
FIG. 4 shows a diagram of an example in-storage acceleration (ISA) platform implemented in a bridge device along with a backend SSD, according to one embodiment.

FIG. 4 shows a diagram of an example ISA platform implemented in a bridge device along with a backend SSD, according to one embodiment. For example, the backend SSD is a standard NVMe SSD accessible over a PCIe link to the bridge device. The bridge device and the backend SSD may be packaged as a single storage device that is visible to the host as an "eSSD." The bridge device 400 includes a processor 411, a PCIe end point (EP) 421, a PCIe interface 417 to interface with a backend SSD 450, an optional Ethernet interface 418 in the case of an NVMe-oF bridge device, a black-box reconfiguration controller 422, a data buffer 423, an NVMe/NVMe-oF host interface 424, and reconfigurable logic blocks 425. The reconfigurable logic blocks 425 may be a field-programmable gate array (FPGA) including an array of programmable logic blocks and reconfigurable interconnects that can programmably connect the logic blocks. The logic blocks can be configured to perform complex combinational functions, or merely simple logic gates like AND XOR. In addition, the logic blocks can also include memory elements such as flip-flops or more complete blocks of memory. However, the reconfigurable logic blocks 425 are not limited to FPGA blocks, and different forms and types of programmable/reconfigurable logic blocks may be used without deviating from the scope of the present disclosure.

The reconfiguration logic blocks 425 include partitions of RTL black-boxes 432a-432n. Each partition of the RTL black-boxes 432 includes a certain amount of hardware resources and certain number and type of interfaces to the other functional modules such as the black-box configuration controller 422, the data buffer 423, the NVMe/NVMe-oF host interface 424 via a system bus 430. A user can select an RTL black-box 432 and implement a third-party RTL functionality within the resource and interface constraints of the selected RTL black-box 432. In some cases, the user can implement an RTL functionality using only a firmware black-box. In this case, the firmware black-box may use prepopulated RTL components of an RTL black-box 432.

The bridge device 400 intercepts host commands received from the PCIe bus or the Ethernet destined for the backend SSD 450 and can provide not only an access to the data stored in the backend SSD 450 but also near storage data processing using the integrated processor 411. The BB configuration controller 422 can download RTL bitstreams into one or more RTL black-boxes 432 and load the corresponding driver binary file image to the processor 411 to run the corresponding black-box driver 431 using a processor core of the processor 411.

Figure 5:
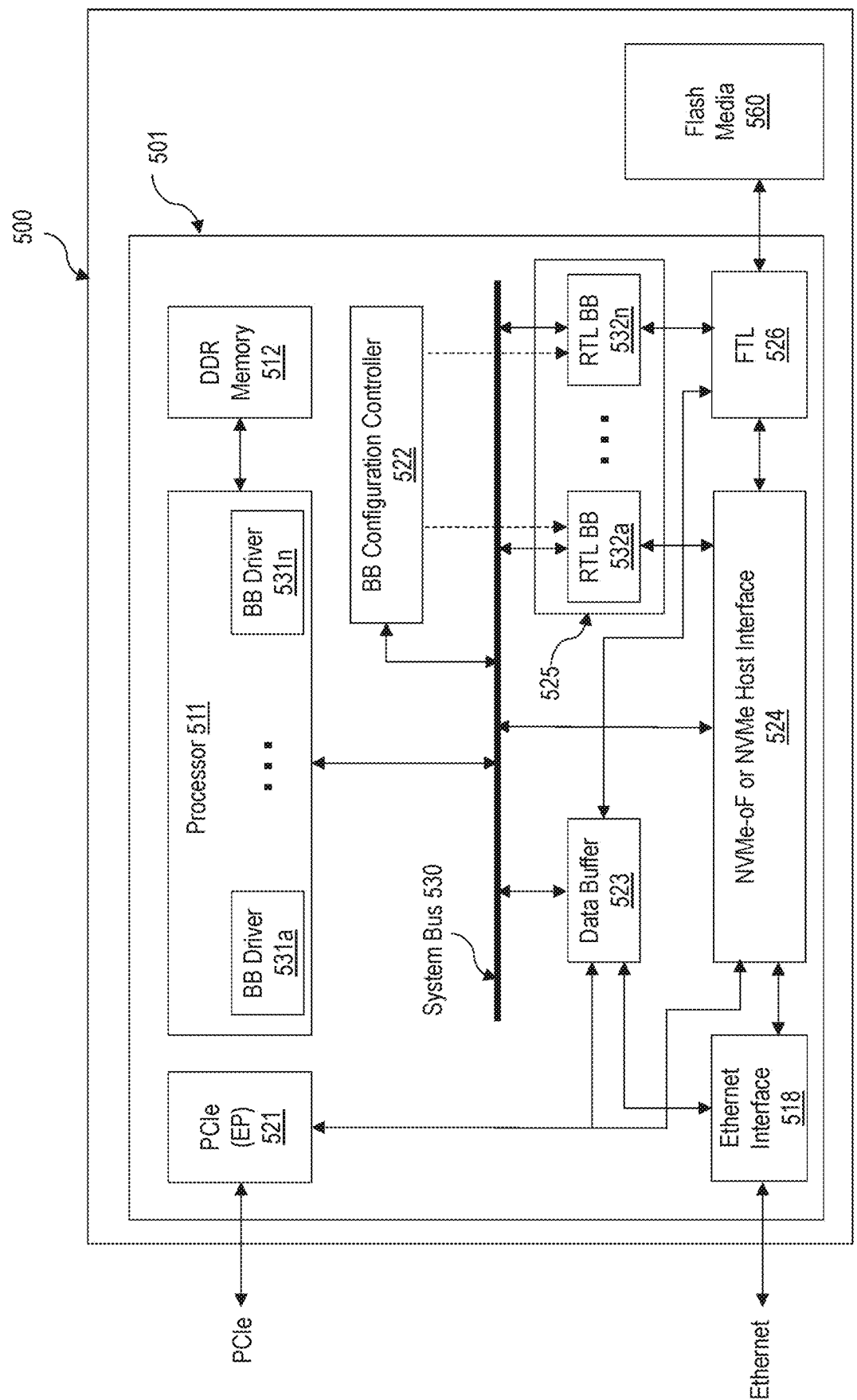
FIG. 5 shows a diagram of an example ISA platform implemented in a data storage device, according to one embodiment.

FIG. 5 shows a diagram of an example ISA platform implemented in a data storage device, according to one embodiment. The data storage device 500 can be an NVMe SSD or an NVMe-oF SSD. In some embodiments, the data storage device 500 can refer to a storage controller of the NVMe SSD or the NVMe-oF SSD. The data storage device 500 includes a controller 501 and a flash media 560. The controller 501 includes a processor 511, a PCIe EP 521, an optional Ethernet interface 518 in the case of an NVMe-OF SSD, a black-box reconfiguration controller 522, a data buffer 523, an NVMe/NVMe-oF host interface 524, and reconfigurable logic blocks 525. The reconfiguration logic blocks 525 include partitions of RTL black-boxes 532a-532n. Each partition of the RTL black-boxes 532 includes a certain amount of hardware resources and certain number and type of interfaces to the other functional modules such as the black-box configuration controller 522, the data buffer 523, the NVMe/NVMe-OF host interface 524 via a system bus 530. Many of the constituent elements in the data storage device 500 are similar to or same as those described in the example of a bridge device shown in FIG. 4. Instead of the PCIe interface 417 to the backend SSD 450, the controller 501 has a flash translation layer (FTL) module 526 to interface with the flash media 560 for reading user data from and writing user data to the flash media 560. In this native implementation, there is no need to have a bridge device connected to the backend SSD, as the SSD controller itself can perform the functions that are otherwise performed by the bridge device.

The FPGA-based reconfigurable logic blocks (e.g., the reconfigurable logic blocks 425 of FIG. 4 and 525 of FIG. 5) can be reprogrammed to perform a variety of user-programmable logic functions. Each of the reconfigurable logic block may include: a) look-up tables (LUT), a random-access memory (RAM), and c) reconfigurable interconnects. Using these three components, a variety of data processing circuits can be implemented in hardware. The reconfigurable logic blocks can provide high performance of a typical application-specific integrated circuit (ASIC) and flexibility of software implementations at the same time.

An application's data processing functionality is implemented in the form of an RTL model using programmable languages such as Verilog and VHDL. The RTL models are then synthesized into gate level circuits. The synthesized circuits are in turn mapped to the FPGA resources such as LUTs, RAM, and interconnects to realize physical implementation of the gate level netlists. The final implementation is represented in the form of a bit stream or a bit file. A bitstream is essentially a bit map for the interconnect switches in the FPGA. By turning on and off appropriate interconnect switches, a desired circuit is realized in the FPGA. The bitstream of bit file is configured or downloaded into the FPGA after power on or at a desired time point. Once the bitstream is configured, the interconnect switches remain in that programmed state until a reset or power cycle. Once bitstream configuration or programming is complete, the data processing function can start its operation. It is possible to stop the current data processing circuit and re-configure the FPGA with a different bitstream to launch a new data processing function.

According to one embodiment, the present ISA platform can have a number of FPGA cores, one for each RTL black-box at its disposal. Each RTL black-box can be pre-defined and pre-provisioned with resources including, but not limited to, a logic area, interconnects, LUTs, RAM blocks, specialized hard macros (e.g., a PCIe controller, digital signal processor (DSP) arithmetic logic units (ALUs)), and clock and reset signals.

The RTL black-boxes may have various pre-defined and pre-provisioned interfaces. Examples of the interfaces include, but are not limited to, a programmable clock/reset, an advanced extensible interface (AXI) to the embedded processor, a double data rate (DDR) memory interface, PCIe (EP/RP) interfaces, an Ethernet interface, custom interfaces for specialized ISA services or functions, and any other interfaces.

In addition, each of the RTL black-boxes 532 can have a configuration interface to the corresponding configuration controller 522. This interface is not visible to the user and is used to download the user circuits into the RTL black-boxes 532.

According to one embodiment, the SSD controller or the bridge controller can be implemented in a FPGA. In this case, an area of the FPGA can be set aside and reserved as RTL black-boxes. Those FPGA partitions that are set aside and reserved can be used to download user bitstreams during runtime.

The present ISA platform provides a number of AABB slots for accelerating a user application. A user is capable of using the AABB slots (or black-boxes) to implement functions that can be run by the controller of a bridge device of the data storage device itself in a self-service model. Therefore, the present ISA platform is not aware of the actual function that is run in the AABB slots. To facilitate such customer self-service architecture, the present ISA platform employs a discovery mechanism for an end-user to discover a bridge device or a data storage device that supports application acceleration. According to one embodiment, the present ISA platform enables a device to provide an advertise/publish mechanism to indicate that the device can support application acceleration using the integrated programmable/reconfigurable AABB slots. For example, the device can issue an NVMe Identify command to advertise/publish the AABB support.

The device that supports application acceleration near or in-storage can use the Identify data structure to provide various attributes and characteristics of the supported AABB features. Some examples of the attributes, parameters, and characteristics of the AABB supporting device that can be made available through the Identify data structure. For example, the Identify data structure can include the information regarding the number of AABB slots with RTL black-box and the firmware black-box, the number of AABB slots with firmware-only black-box, the data structure per AABB slot with RTL black-box and firmware black-box parameters. Examples of the parameters for the RTL black-box component include, but are not limited to, the area, interconnect resources, the number of logic resources, the attributes of the LUTs, the number of RAM blocks, the size etc., the maximum clock frequency, and the number and types of interfaces. Examples of the parameters for firmware black-box component include, but are not limited to, the firmware code size for the associated firmware black-box, and the processor information.

According to one embodiment, the AABB supporting device can issue an NVMe command, herein referred to as, the "AABB Download" command to download an image to the RTL black-boxes. FIG. 6 shows an "AABB Download" command format, according to one embodiment. OPC is an 8-bit special opcode reserved for an admin command set or vendor-defined command set. CID is a 16-bit command identifier. DPTR is a data pointer using SGL or PRP method. DPTR points to the AABB image in the host memory. NUMD is a number of Dwords (32-bit unsigned integer) for the transfer of the image. OFST is an offset for the current transfer. AABB slot ID contains the AABB slot identifier to be used for the AABB image.

The present ISA platform provides a number of AABB slot management functions for the smooth operation of AABB mechanism. Once the AABB image is downloaded to a AABB slot, the downloaded AABB image is held under reset by default until the application issues an explicit activate trigger command to launch the AABB image on the ISA platform. The application can also pause or reset a specific AABB image that is currently running. The application can discard one or more downloaded AABB images from the ISA platform. To facilitate such AABB management functions, the present ISA platform employs a new set of NVMe AABB slot management commands.

Figure 7:
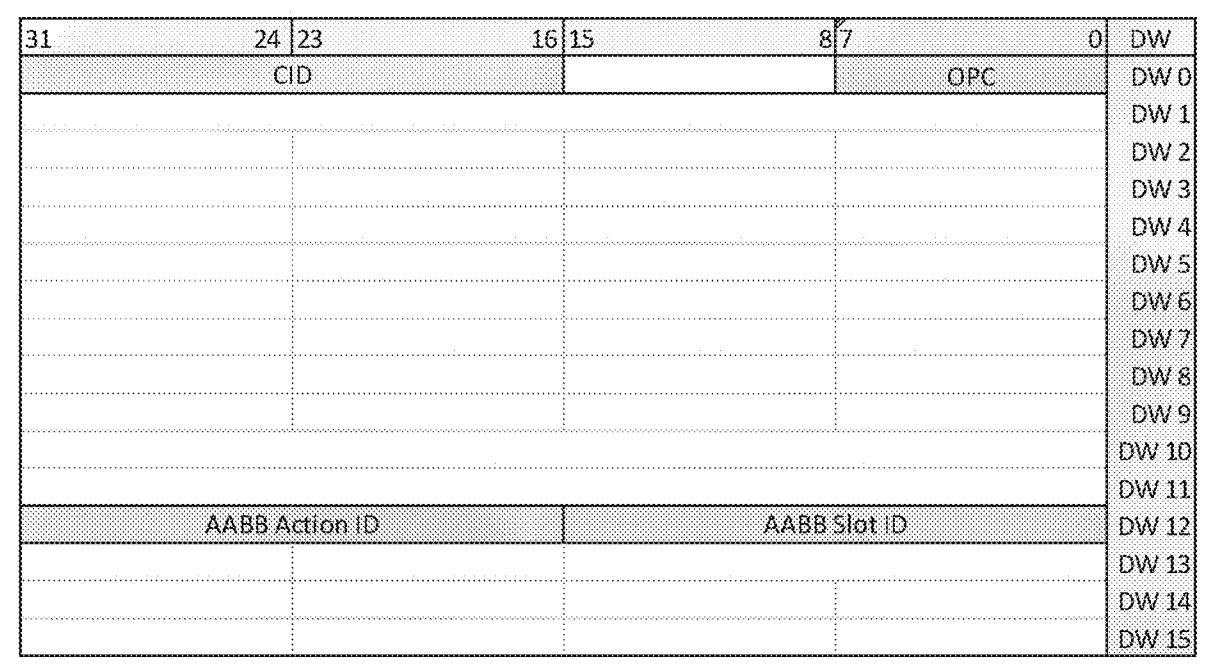

FIG. 7 shows an example of AABB slot management commands, according to one embodiment. OPC is a special opcode that is reserved for an admin command set or a vendor-defined command set, and CID is a command identifier. AABB slot ID is an AABB slot identifier to be used for the AABB slot management command. AABB action ID indicates the management action to be performed. For example, 0x1 enables specified AABB image; 0x2 disables the specified AABB image; 0x3 resets the specified AABB image; 0x4 discards the specified AABB image. Other AABB action IDs may be used in places or in conjunction with these action IDs.

Figure 8:
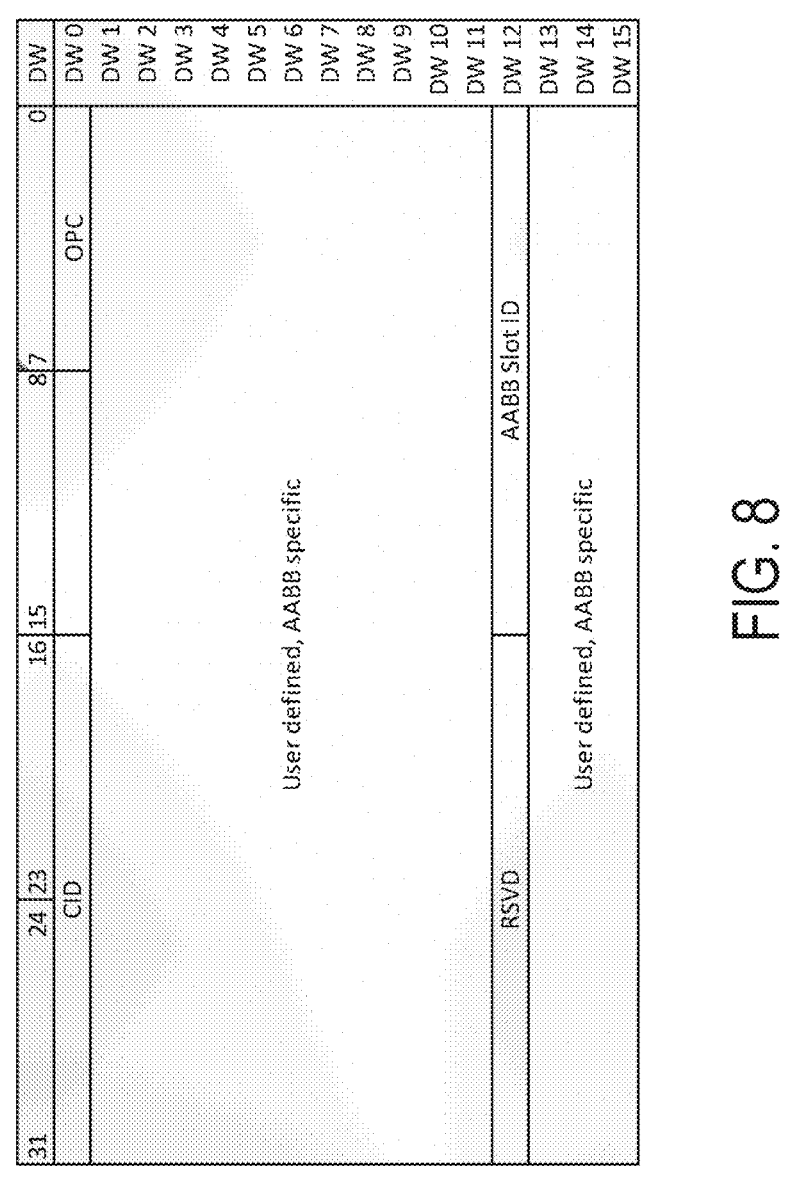

Once an AABB image is downloaded and launched in the ISA platform, the application can communicate with the AABB image using a new set of NVMe commands, herein referred to as an "AABB Comm" command. The application can send an "AABB Comm" command to the AABB, and the AABB may respond back to the application. For example, the application may send certain queries to an AABB, and the AABB may send back the results to the application. Such host and AABB communication can be implemented as a part of the NVMe or NVMe-oF protocol. In this case, the AABB Comm commands can have a standard format of a special NVMe command so that the present ISA platform can intercept and forward to an appropriate AABB image running on the ISA platform. FIG. 8 shows an example format of an AABB Comm command, according to one embodiment. OPC is a special opcode that is reserved for an admin command set or a vendor-defined command set, and CID is a command identifier. AABB slot ID is an AABB slot identifier to be used for the AABB slot management command.

According to one embodiment, multiple AABB images may be active at any given time. Hence as shown in FIG. 8, the AABB Comm command also carries a 16-bit AABB Slot ID. This AABB slot ID is used by the ISA platform to deliver the intercepted AABB Comm command to the correct AABB slot.

In addition to AABB Comm command interception, the present ISA platform provides a set of standard APIs that an AABB driver can use to communicate with the application running on the remote host computer and transfer user data to and from the data storage device. The APIs that the present ISA platform provides includes various commands, for example, 1) a command to intercept an AABB Comm command and deliver it to an appropriate AABB slot, 2) a command to send AABB Comm command completion entry back to the application, 3) a command to read a user data from the data storage device, 4) a command to write AABB data to the data storage device, 5) a command to read user data from a host memory, and 6) a command to write AABB data to the host memory.

The first command to intercept and deliver AABB Comm commands to an appropriate AABB slot can be a 64B command including a submission queue identifier (SQID) on which the command is received. The second command to send the AABB Comm command completion entry to the application running on the host computer can include a 16B completion entry (CE) and an SQID. The third command to read user data from the data storage device can include, a namespace ID (NSID), a start logical block address (SLBA), a number of blocks (NLB), a destination address in the ISA platform, and only other relevant information necessary. The fourth command to write AABB data to the data storage device can include an NSID, an SLBA, an NLB, a source address in the ISA platform, and any other relevant information necessary. The fifth command to read user data from the host memory can include a source address (SGL or PRP) in the host memory, a destination address in the ISA platform, a length of transfer, and any other relevant information necessary. The sixth command to write AABB data to the host memory can include a source address in the ISA platform, a destination address (SGL or PRP) in the host memory, a length of transfer, and any other relevant information necessary.

Using these APIs, an AABB firmware can receive a host application command and send appropriate completion entry for the received AABB Comm command back to the host application. The API commands to read and write user data from and to the data storage device can be used to allow an AABB to process or manipulate user data stored on the data storage device. The AABB can fetch the data to a local buffer, processes it or transform it, and write back the modified data or the processing results back to the data storage device. The API commands to read and write user data from and to the host memory can be used to allow the AABB firmware to orchestrate data transfers with the remote host as well as the backend data storage device or directly with NAND flash media of the data storage device. Using these host application command reception, command completions, and data transfers from both the host and data storage device, the ISA platform can perform desired functions of user data processing and manipulations near or within the data storage device.

According to one embodiment, the AABB firmware can initiate data transfers to/from the host memory using the AABB commands. The host and AABB can also exchange data through the data storage device in some embodiment. A host computer can directly read or write user data to the data storage device, and the AABB can read or modify user data at rest in the data storage device. The AABB commands for host data movements can be used by the AABB firmware to orchestrate data manipulations on the fly. In some use cases, the AABB can perform data manipulation or data transformation as the data gets read or written by the host computer.

Figure 9:
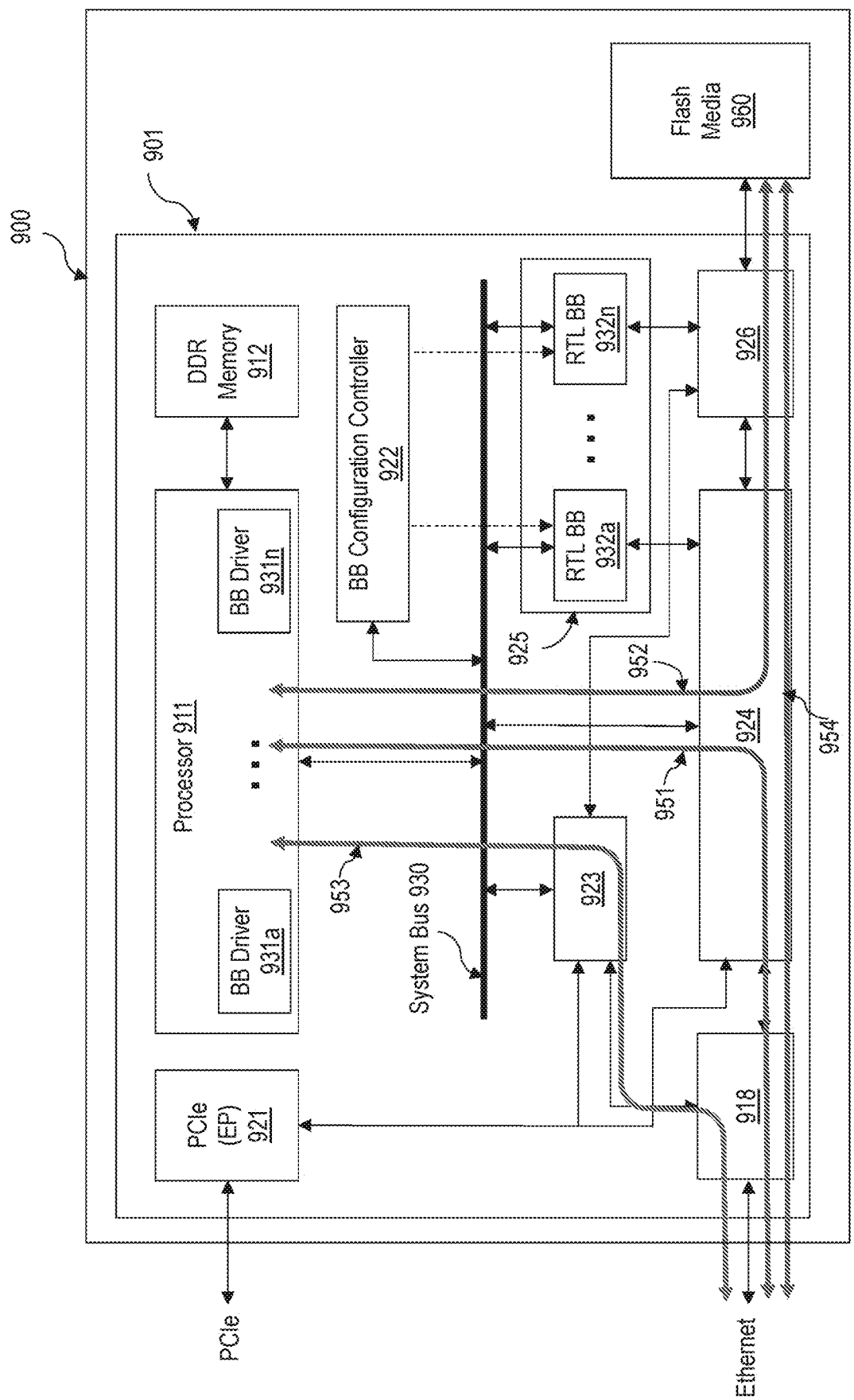
FIG. 9 shows a diagram showing example command and data flows in an AABB capable NVMe-oF SSD, according to one embodiment.

FIG. 9 shows a diagram showing example command and data flows in an AABB capable NVMe-oF SSD, according to one embodiment. The NVMe-oF SSD 900 includes a controller 901 and a flash media 960. The controller 901 includes a processor 911, a PCIe EP 921, an Ethernet interface 918, a black-box reconfiguration controller 922, a data buffer 923, an NVMe-oF host interface 924, and reconfigurable logic blocks 925. The reconfiguration logic blocks 925 include partitions of RTL black-boxes 932a-932n. Each partition of the RTL black-boxes 932 includes a certain amount of hardware resources and certain number and type of interfaces to the other functional modules such as the black-box configuration controller 922, the data buffer 923, the NVMe-oF host interface 924 via a system bus 930.

The NVMe-OF SSD 900 can receive host commands via the Ethernet interface 918. The host commands can include AABB commands such as AABB Download commands, AABB slot management commands, and AABB Comm commands. The Ethernet interface 918 can intercept the AABB commands from the remote host computer and forward them to the NVMe-oF host interface 924 and to the processor 911 via the command path 951. The processor 911 of the NVMe-oF SSD 900 can generate a completion entry and sends it back to the host application via the command path 951 through the NVMe-oF host interface 924 and the Ethernet interface 918. While running the downloaded AABBs, the processor 911 can issue AABB initiated internal commands (as opposed to the host-initiated commands) for reading and writing user data to the flash media 960 via the command path 952 through the NVMe-oF host interface 924 and the FTL 926. In addition, the processor 911 can communicate with the host application for reading and writing user data from and to the host memory via the command path 953 through the data buffer 923 and the Ethernet interface 918. The host application can initiate data read and write operations to read and write user data to/from the host memory to the flash media 960 via the path 954 through the Ethernet interface 918, the NVMe-oF host interface 924, and the FTL 926.

Figure 10:
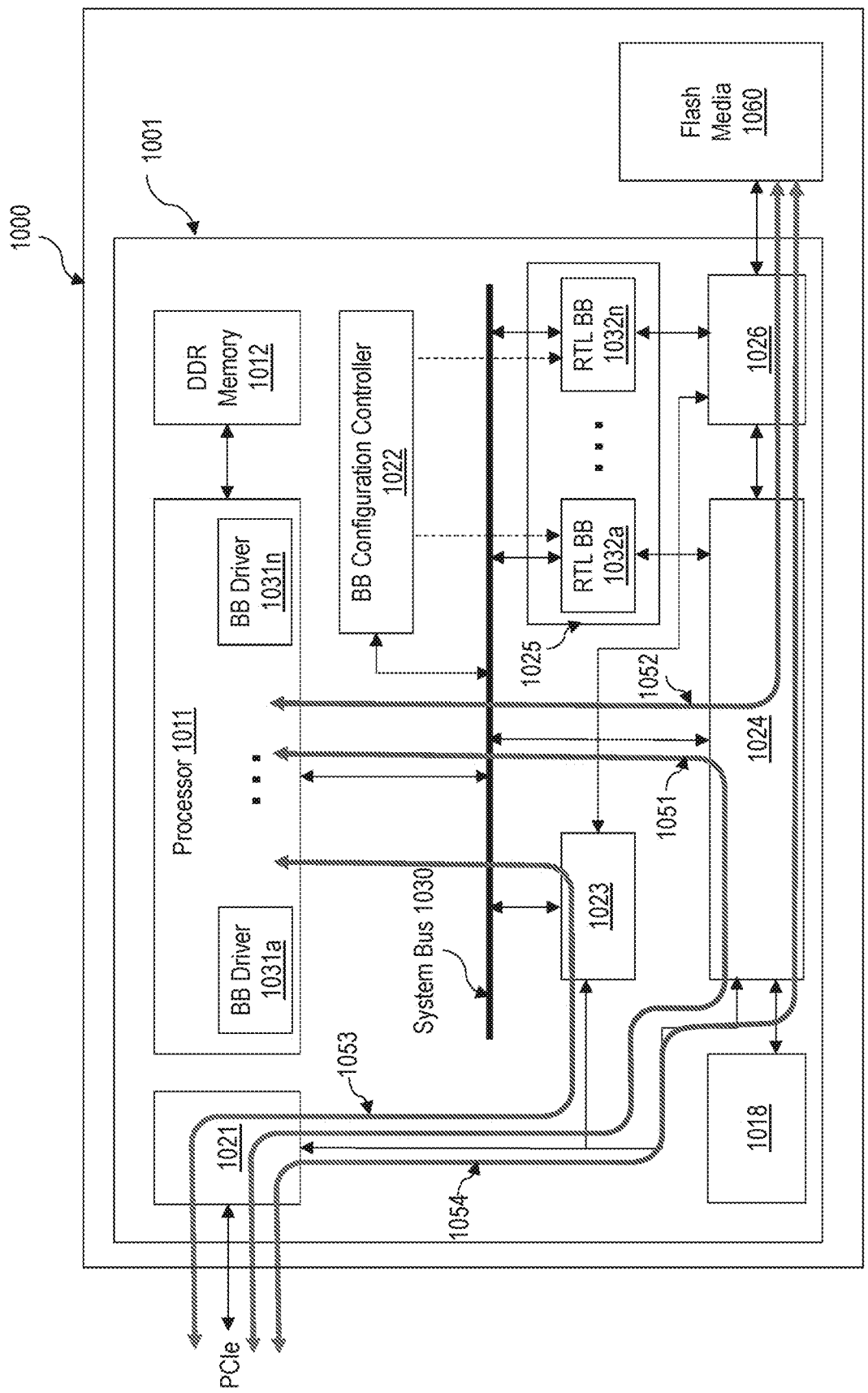
FIG. 10 shows a diagram showing example command and data flows in an AABB capable NVMe SSD, according to another embodiment.

FIG. 10 shows a diagram showing example command and data flows in an AABB capable NVMe SSD, according to another embodiment. The NVMe SSD 1000 includes a controller 1001 and a flash media 1060. The controller 1001 includes a processor 1011, an Ethernet interface 1018 (optional), a PCIe EP interface 1021, a black-box reconfiguration controller 1022, a data buffer 1023, an NVMe host interface 1024, and reconfigurable logic blocks 1025. The reconfiguration logic blocks 1025 include partitions of RTL black-boxes 1032a-1032n. Each partition of the RTL black-boxes 1032 includes a certain amount of hardware resources and certain number and type of interfaces to the other functional modules such as the black-box configuration controller 1022, the data buffer 1023, the NVMe host interface 1024 via a system bus 1030.

The NVMe SSD 1000 can receive host commands via the PCIe EP interface 1021. The host commands can include AABB commands such as AABB Download commands, AABB slot management commands, and AABB Comm commands. The PCIe EP interface 1021 can intercept the AABB commands from the remote host computer and forward them to the NVMe host interface 1024 and to the processor 1011 via the command path 1051. The processor 1011 of the NVMe SSD 1000 can generate a completion entry and sends it back to the host application via the command path 1051 through the NVMe host interface 1024 and the PCIe EP interface 1021. While running the downloaded AABBs, the processor 1011 can issue AABB initiated internal commands (as opposed to the host-initiated commands) for reading and writing user data to the flash media 1060 via the command path 1052 through the NVMe host interface 1024 and the FTL 1026. In addition, the processor 1011 can communicate with the host application for reading and writing user data from and to the host memory via the command path 1053 through the data buffer 1023 and the PCIe EP interface 1021. The host application can initiate data read and write operations to read and write user data to/from the host memory to the flash media 1060 via the path 1054 through the PCIe EP interface 1021, the NVMe host interface 1024, and the FTL 1026.

According to one embodiment, a data storage device includes: a data storage medium; a processor comprising a plurality of processor cores; a plurality of application acceleration black-box (AABB) slots including reconfigurable logic blocks, interconnects, and memories; a host interface that receives a host command from a remote application running on a remote host computer, wherein the host command includes an image file including a register-transfer level (RTL) bitstream and a firmware driver; and a configuration controller that downloads the RTL bitstream to an AABB slot of the plurality of AABB slots and reconfigure the AABB slot, and load the firmware driver to a processor core of the processor. The processor core loaded with the firmware driver runs a data acceleration process of the remote application to access and process data stored in the data storage medium using the RTL bitstream downloaded in the AABB slot.

The data storage device may be a nonvolatile memory express (NVMe) solid-state drive (SSD).

The data storage device may be an NVMe over fabrics (NVMe-oF) SSD, and the host interface may be an Ethernet interface.

The remote host computer may send a second RTL bitstream and a second firmware image to the data storage device, and the configuration controller may discard the RTL bitstream downloaded to the AABB slot, download the second RTL bitstream, and load the second firmware to the processor core to run a second data acceleration process using the second RTL bitstream and the second firmware.

The data storage device may further send discovery information to the remote application, and the discovery information may include features, characteristics, and attributes of the AABB slots.

The host command may include a management command for enabling, disabling, and discarding the RTL bitstream and the firmware driver.

The host command may include an AABB slot communication command to communicate with an active AABB slot, and the AABB slot communication command may include an identifier of an active AABB slot.

The processor core loaded with the firmware driver may access the data stored in the data storage medium while running the data acceleration process of the remote application using a set of application program interface (API) calls that are agnostic to the remote application.

One or more AABB slots may include a logic area, interconnects, look-up tables (LUTs), random-access memory (RAM) blocks, hard macros, and clock and reset signals.

One or more AABB slots may include a programmable clock/reset, an advanced extensible interface (AXI) to the processor core, a double data rate (DDR) memory interface, a peripheral component interconnect express (PCIe) interface, and an Ethernet interface.

According to another embodiment, a bridge device includes: a data storage interface that accesses data stored in a data storage medium of a data storage device; a processor comprising a plurality of processor cores; a plurality of application acceleration black-box (AABB) slots including reconfigurable logic blocks, interconnects, and memories; a host interface that receives a host command from a remote application running on a remote host computer, wherein the host command includes an image file including a register-transfer level (RTL) bitstream and a firmware driver; and a configuration controller that downloads the RTL bitstream to an AABB slot of the plurality of AABB slots and reconfigure the AABB slot, and load the firmware driver to a processor core of the processor. The processor core loaded with the firmware driver runs a data acceleration process of the remote application to access the data stored in the data storage medium of the data storage device via the data storage interface and process the data using the RTL bitstream downloaded in the AABB slot.

The data storage interface may be an NVMe interface.

The host interface may be an Ethernet interface, and the data storage device may be an NVMe-oF SSD.

The remote host computer may send a second RTL bitstream and a second firmware image to the bridge device, and the configuration controller may discard the RTL bitstream downloaded to the AABB slot, download the second RTL bitstream, and load the second firmware to the processor core to run a second data acceleration process using the second RTL bitstream and the second firmware.

The bridge device may further send discovery information to the remote application, wherein the discovery information may include features, characteristics, and attributes of the AABB slots.

The host command may include a management command for enabling, disabling, and discarding the RTL bitstream and the firmware driver.

The host command may include an AABB slot communication command to communicate with an active AABB slot, and the AABB slot communication command may include an identifier of an active AABB slot.

The processor core loaded with the firmware driver may access the data stored in the data storage medium via the data storage interface while running the data acceleration process of the remote application using a set of application program interface (API) calls that are agnostic to the remote application.

One or more AABB slots may include a logic area, interconnects, look-up tables (LUTs), random-access memory (RAM) blocks, hard macros, and clock and reset signals.

One or more AABB slots may include a programmable clock/reset, an advanced extensible interface (AXI) to the processor core, a double data rate (DDR) memory interface, a peripheral component interconnect express (PCIe) interface, and an Ethernet interface.

The above example embodiments have been described hereinabove to illustrate various embodiments of implementing a system and method for providing in-storage acceleration in data storage devices, particularly NVMe and NVMe-OF devices. Various modifications and departures from the disclosed example embodiments will occur to those having ordinary skill in the art. The subject matter that is intended to be within the scope of the invention is set forth in the following claims.

What is claimed is:

1. A method comprising:
   receiving by a controller having a processor, a command from a computing device, the command including first data, first instructions, and a first identifier;
   identifying a first portion of a processing circuit based on the identifier;
   programing the first portion of the processing circuit based on the first data;
   loading by the controller the first instructions to a first area of the processor associated with the first identifier for running a first process, wherein the first process is configured to access data stored in a non-transitory data storage medium coupled to the controller;
   receiving by the controller second instructions and a second identifier; and
   loading by the controller the second instructions to a second area of the processor associated with the second identifier for running a second process.

2. The method of claim 1, wherein the non-transitory data storage medium is included in a solid-state drive (SSD).

3. The method of claim 1, wherein the command includes configuration data for configuring hardware components associated with the first area of the processor.

4. The method of claim 3, wherein the configuration data includes a first register transfer level (RTL) bitstream.

5. The method of claim 3, wherein the hardware components include at least one of a clock or a communication interface.

6. The method of claim 1, wherein the first instructions include first driver instructions and the second instructions include second driver instructions.

7. The method of claim 1, wherein the command includes a command for changing a state of the first instructions.

8. The method of claim 1, wherein the command includes a command to communicate with the first area of the processor.

9. The method of claim 1, wherein the processor loaded with the first instructions is configured to access data stored in the non-transitory data storage medium and run the first process using an application program interface (API) call.

10. The method of claim 1, wherein the first area of the processor is associated with at least one of a look-up table (LUT), a random-access memory (RAM), a clock signal, or a reset signal.

11. A device comprising:
    a processing circuit; and
    a controller including a processor,
    wherein the controller is configured to receive a command from a computing device, the command including first data, first instructions, and a first identifier,
    wherein the controller is configured to:
      identify a first portion of the processing circuit based on the identifier;
      program the first portion of the processing circuit based on the first data; and
      load the first instructions to a first area of the processor associated with the first identifier for running a first process, wherein the first process is configured to access data stored in a non-transitory data storage medium coupled to the controller,
    wherein the controller is configured to receive second instructions and a second identifier, and
    wherein the controller is configured to load the second instructions to a second area of the processor associated with the second identifier for running a second process.

12. The device of claim 11, wherein the non-transitory data storage medium is included in a solid-state drive (SSD).

13. The device of claim 11, wherein the command includes configuration data for configuring hardware components associated with the first area of the processor.

14. The device of claim 13, wherein the configuration data includes a first register transfer level (RTL) bitstream.

15. The device of claim 13, wherein the hardware components include at least one of a clock or a communication interface.

16. The device of claim 11, wherein the first instructions include first driver instructions and the second instructions include second driver instructions.

17. The device of claim 11, wherein the command includes a command for changing a state of the first instructions.

18. The device of claim 11, wherein the command includes a command to communicate with the first area of the processor.

19. The device of claim 11, wherein the processor loaded with the first instructions is configured to access data stored in the non-transitory data storage medium and run the first process using an application program interface (API) call.

20. The device of claim 11, wherein the first area of the processor is associated with at least one of a look-up table (LUT), a random-access memory (RAM), a clock signal, or a reset signal.

* * * * *